(12) United States Patent
Lin

(10) Patent No.: US 11,105,618 B2
(45) Date of Patent: Aug. 31, 2021

(54) IMAGE-MEASURING APPARATUS WITHOUT AXIAL ALIGNMENT AND IMAGE-MEASURING METHOD WITHOUT AXIAL ALIGNMENT

(71) Applicant: Ming-Hui Lin, Hsinchu County (TW)

(72) Inventor: Ming-Hui Lin, Hsinchu County (TW)

(*) Notice: Subject to any disclaimer, the term of this patent is extended or adjusted under 35 U.S.C. 154(b) by 198 days.

(21) Appl. No.: 16/490,560

(22) PCT Filed: Jan. 22, 2018

(86) PCT No.: PCT/CN2018/073650
§ 371 (c)(1),
(2) Date: Sep. 1, 2019

(87) PCT Pub. No.: WO2018/157676
PCT Pub. Date: Sep. 7, 2018

(65) Prior Publication Data
US 2020/0072601 A1  Mar. 5, 2020

(30) Foreign Application Priority Data
Mar. 2, 2017 (CN) .......................... 201710119286.9

(51) Int. Cl.
*G01B 11/27* (2006.01)
*G01B 11/24* (2006.01)
(Continued)

(52) U.S. Cl.
CPC .......... *G01B 11/27* (2013.01); *G01B 11/2408* (2013.01); *G01B 11/25* (2013.01); *G01B 5/02* (2013.01)

(58) Field of Classification Search
CPC . G01B 11/2408; G01B 11/2433; G01B 11/25; G01B 11/27; G01B 5/0004; G01B 5/02
See application file for complete search history.

(56) References Cited

U.S. PATENT DOCUMENTS 4,775,236 A * 10/1988 Cohen ................ G01B 11/02
356/640
6,356,264 B1 * 3/2002 Yasui ................ G06T 15/405
345/420
(Continued)

FOREIGN PATENT DOCUMENTS

CN 1255626 A 6/2000
CN 1884965 A 12/2006
(Continued)

*Primary Examiner* — Kara E. Geisel
*Assistant Examiner* — Jarreas C Underwood
(74) *Attorney, Agent, or Firm* — CKC & Partners Co., LLC

(57) ABSTRACT

An image-measuring apparatus without axial alignment is configured to measure a workpiece. The image-measuring apparatus without axial alignment includes a rotating plate, a lighting unit, an image capturing unit, a central control unit and a rotary driving member. The workpiece is disposed on the rotating plate. The lighting unit is configured to generate a light beam to illuminate the workpiece to form a first workpiece blocking shadow area on the image capturing unit. The rotating plate and the workpiece are rotated through a rotational angle by the central control unit to form a second workpiece blocking shadow area on the image capturing unit. The central control unit calculates the first workpiece blocking shadow area and the second workpiece blocking shadow area to generate an axial position of the workpiece. There is a distance between an axial position of the rotating plate and the axial position of the workpiece.

3 Claims, 9 Drawing Sheets

(51) Int. Cl.
*G01B 5/02* (2006.01)
*G01B 11/25* (2006.01)

(56) References Cited

U.S. PATENT DOCUMENTS

| | | | | |
|---|---|---|---|---|
| RE38,025 E | * | 3/2003 | Skunes | H05K 13/0812 |
| | | | | 356/400 |
| 8,264,696 B2 | * | 9/2012 | Knobel | G01B 11/2433 |
| | | | | 356/612 |
| 8,478,561 B2 | * | 7/2013 | Satoh | G01P 3/44 |
| | | | | 702/151 |
| 9,197,880 B2 | * | 11/2015 | Masuda | H04N 13/239 |
| 9,495,068 B2 | * | 11/2016 | Morishita | G06F 3/011 |
| 10,099,487 B2 | * | 10/2018 | Ito | B41J 11/0045 |
| 2006/0290946 A1 | * | 12/2006 | Chien | G01B 11/2433 |
| | | | | 356/613 |
| 2010/0299104 A1 | * | 11/2010 | Tamai | G01B 5/008 |
| | | | | 702/168 |
| 2012/0291299 A1 | | 11/2012 | Kudo et al. | |
| 2016/0195869 A1 | * | 7/2016 | Sagemueller | G05B 19/402 |
| | | | | 700/195 |
| 2017/0167852 A1 | * | 6/2017 | Miki | G01B 11/08 |
| 2021/0121995 A1 | * | 4/2021 | Hykes | B23Q 3/152 |

FOREIGN PATENT DOCUMENTS

| | | |
|---|---|---|
| CN | 101641566 A | 2/2010 |
| CN | 102650516 A | 8/2012 |
| CN | 102901453 A | 1/2013 |
| CN | 103335602 A | 10/2013 |
| CN | 103453848 A | 12/2013 |
| CN | 104006754 A | 8/2014 |
| CN | 104180763 A | 12/2014 |
| CN | 104296655 A | 1/2015 |
| CN | 104344792 A | 2/2015 |
| CN | 104482868 A | 4/2015 |
| CN | 104597053 A | 5/2015 |
| CN | 106885522 A | 6/2017 |
| TW | M358291 U | 6/2009 |

* cited by examiner

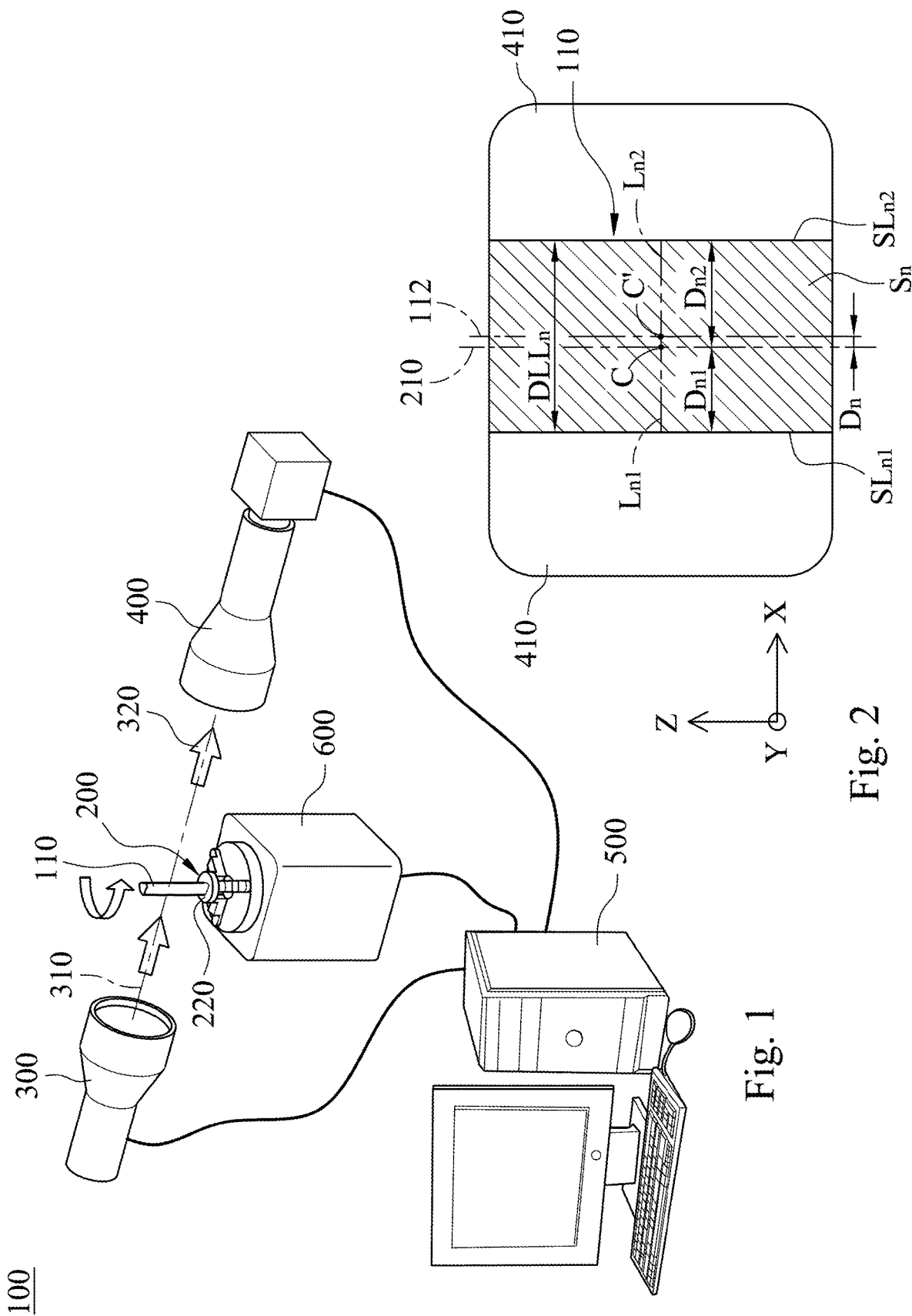

IMAGE-MEASURING APPARATUS WITHOUT AXIAL ALIGNMENT AND IMAGE-MEASURING METHOD WITHOUT AXIAL ALIGNMENT

RELATED APPLICATIONS

This application is a continuation of International application No. PCT/CN2018/073650, filed Jan. 22, 2018, which claims the benefits of priority of CN application No. 201710119286.9 filed on Mar. 2, 2017, the content of which are incorporated herein by reference.

BACKGROUND

Technical Field

The present disclosure relates to an image-measuring apparatus and an image-measuring method. More particularly, the present disclosure relates to an image-measuring apparatus without axial alignment and an image-measuring measuring method without axial alignment which are capable of quickly and accurately estimating an axial position and a contour size of the workpiece.

Description of Related Art

In recent years, the method of rear-projection image measurement has been widely used in industrial measurement, but it can only be used to measure the plane contour. When measuring a shaft-shaped workpiece, many measurement items are not only about the plane contour, but also you must rotate the workpiece to measure. In order to acquire accurate measuring results, the conventional rear-projection measurement must rely on the accurate alignment of central axis by horizontally clamping the concentric shaft parts. Because accurate alignment is not easy to be done by manual operation, the measurement is not so quick and effective consequently.

For example, a screw is a shaft-shaped workpiece, and its characteristic dimensions could be calculated as long as any contour image of the screw is captured. However, if the cross-section of the screw is not circular but is triangular (hereinafter referred to as triangular thread screw), we must accurately find the three midlines to calculate the outer diameter and the length of the center line of the triangular thread screw. But for the conventional projection measurement, it must rely on an accurate rotational fixture to find the exact midline position. Even if adopting the accurate rotational fixture, the cross-section of the screw is not exactly triangular because of the deformation cause by forming, and the concentricity of the screw shaft and the cap is not accurate enough in general. Therefore, the rotational center does not accurately pass through a centroid of the triangle by using the rotational fixture to clamp any position of the triangular thread screw, so that the outer diameter and the length of the center line of the triangular thread screw often have a relatively high inaccuracy.

Currently, the outer diameter of the triangular thread screw can be measured by a V-type micrometer. As the three-point circle-fitting is a common principle used to compute the outer diameter, such that the vertexes of the triangle have to be accurately fit in a V-notch of the V-type micrometer; otherwise, the measured value will be inaccurate. The triangular thread screw which is manufactured by a general process is not a perfect equilateral triangle, so that the outer diameter measured by the V-type micrometer is for reference only. The length of the center line of the triangular thread screw is measured by a general micrometer, and it still has the problem that the vertexes of the triangle have to be accurately fit in a notch of the general micrometer. Accordingly, the V-type micrometer and the general micrometer are both a kind of contact measuring method, and the measurement accuracy is still heavily determined by an operator's experience and techniques. The increased error rate caused by human factors is often a potential problem for such kind of contact measuring method.

Therefore, an image-measuring apparatus without axial alignment and an image-measuring method which are capable of arbitrarily placing the workpiece, quickly and accurately estimating an axial position and a contour size of the workpiece, and accomplishing high convenience of measurement are commercially desirable.

SUMMARY

Accordingly, the present disclosure provides an image-measuring apparatus without axial alignment and an image-measuring measuring method without axial alignment to utilize a non-contact image measuring technique so as to accurately estimate the workpiece axial position of the workpiece. The workpiece can be arbitrarily placed or clamped on the rotating plate without axial alignment, thereby generating a characteristic size of the workpiece and accomplishing high convenience of measurement. In addition, the image-measuring apparatus without axial alignment and the image-measuring measuring method without axial alignment of the present disclosure utilize the image measuring technique without axial alignment so as to reduce the manpower and cost, and the accuracy is relatively high.

According to one aspect of the present disclosure, an image-measuring apparatus without axial alignment is configured to measure a workpiece. The image-measuring apparatus without axial alignment includes a rotating plate, a lighting unit, an image capturing unit, a central control unit and a rotary driving member. The rotating plate includes a rotating axial position which is an axial position of the rotating plate. The workpiece is disposed on the rotating plate. The lighting unit is configured to generate a light beam traveling along an illumination path. The illumination path passes through the workpiece. The image capturing unit is disposed on the illumination path to receive the light beam. The workpiece blocks a part of the light beam so as to form a first workpiece blocking shadow area on the image capturing unit. The central control unit is signally connected to the rotating plate, the lighting unit and the image capturing unit. The rotating plate and the workpiece are rotated through a rotational angle by the central control unit so as to form a second workpiece blocking shadow area on the image capturing unit. The central control unit calculates the first workpiece blocking shadow area and the second workpiece blocking shadow area to generate a pre-rotation distance parameter and a post-rotation distance parameter, and the central control unit calculates the pre-rotation distance parameter and the post-rotation distance parameter to generate a workpiece axial position which is an axial position of the workpiece. The rotary driving member is connected to the rotating plate. The rotary driving member is controlled by the central control unit to rotate the rotating plate so as to synchronously rotate the workpiece. There is a distance between the rotating axial position and the workpiece axial position, and the distance is configured to judge whether the rotating axial position is aligned with the workpiece axial position.

Therefore, the image-measuring apparatus without axial alignment of the present disclosure utilizes a non-contact image measuring technique to accurately estimate the workpiece axial position of the workpiece. The workpiece can be arbitrarily placed or clamped on the rotating plate without axial alignment, thereby generating a characteristic size of the workpiece.

According to one embodiment, the rotating plate further includes a virtual rotating axis and a supporting surface. The virtual rotating axis is perpendicular to an XY plane. The virtual rotating axis is corresponding to the rotating axial position. The supporting surface perpendicularly intersects the virtual rotating axis and is parallel to the XY plane. The workpiece is disposed on the supporting surface. The rotational angle is greater than 0 degrees and less than 180 degrees, and the distance is greater than or equal to 0 and less than a radius of the rotating plate. In addition, a shape of the first workpiece blocking shadow area is corresponding to a contour of the workpiece. The first workpiece blocking shadow area includes a first pre-rotation contour edge line, a second pre-rotation contour edge line, a first pre-rotation virtual measuring line and a second pre-rotation virtual measuring line. The first pre-rotation contour edge line is located at one side of the virtual rotating axis. The second pre-rotation contour edge line is separated from the first pre-rotation contour edge line by a pre-rotation edge distance. The first pre-rotation virtual measuring line is parallel to the XY plane. The first pre-rotation virtual measuring line has a first pre-rotation distance between the first pre-rotation contour edge line and the virtual rotating axis. The second pre-rotation virtual measuring line is linked to the first pre-rotation virtual measuring line. The second pre-rotation virtual measuring line is parallel to the XY plane. The second pre-rotation virtual measuring line has a second pre-rotation distance between the second pre-rotation contour edge line and the virtual rotating axis. The rotating axial position represents an intersection point between the virtual rotating axis and the first pre-rotation virtual measuring line. The first pre-rotation virtual measuring line and the second pre-rotation virtual measuring line are calculated by the central control unit to generate the first pre-rotation distance and the second pre-rotation distance, respectively. The pre-rotation distance parameter includes the first pre-rotation distance and the second pre-rotation distance, and the pre-rotation edge distance is a sum of the first pre-rotation distance and the second pre-rotation distance. Moreover, the central control unit calculates the first pre-rotation virtual measuring line and the second pre-rotation virtual measuring line to generate two virtual vertical edge lines parallel to each other. The two virtual vertical edge lines are perpendicular to the first pre-rotation virtual measuring line and the second pre-rotation virtual measuring line, respectively, and the two virtual vertical edge lines are tangent to the first pre-rotation contour edge line and the second pre-rotation contour edge line, respectively.

In addition, a shape of the second workpiece blocking shadow area is corresponding to a contour of the workpiece, and the second workpiece blocking shadow area includes a first post-rotation contour edge line, a second post-rotation contour edge line, a first post-rotation virtual measuring line and a second post-rotation virtual measuring line. The first post-rotation contour edge line is located at one side of the virtual rotating axis. The second post-rotation contour edge line is separated from the first post-rotation contour edge line by a post-rotation edge distance. The first post-rotation virtual measuring line is parallel to the XY plane. The first post-rotation virtual measuring line has a first post-rotation distance between the first post-rotation contour edge line and the virtual rotating axis. The second post-rotation virtual measuring line is linked to the first post-rotation virtual measuring line. The second post-rotation virtual measuring line is parallel to the XY plane. The second post-rotation virtual measuring line has a second post-rotation distance between the second post-rotation contour edge line and the virtual rotating axis. The first post-rotation virtual measuring line and the second post-rotation virtual measuring line are calculated by the central control unit to generate the first post-rotation distance and the second post-rotation distance, respectively. The post-rotation distance parameter includes the first post-rotation distance and the second post-rotation distance, and the post-rotation edge distance is a sum of the first post-rotation distance and the second post-rotation distance. Moreover, a number of rotations of the rotating plate reaches a rotational number, and the rotational number is greater than or equal to 1. The rotational number, the first workpiece blocking shadow area and the second workpiece blocking shadow area are calculated by the central control unit to generate a plurality of edge line groups. Each of the edge line groups includes two virtual vertical edge lines parallel to each other. The edge line groups are connected to each other so as to form a virtual polygon, and the virtual polygon, the pre-rotation distance parameter and the post-rotation distance parameter are calculated by the central control unit to generate the workpiece axial position which is the axial position of the workpiece.

According to another aspect of the present disclosure, an image-measuring method without axial alignment is configured to measure a workpiece. The image-measuring method without axial alignment provides a workpiece disposing step, a workpiece rotating step, an image capturing step and an axial position calculating step. The workpiece disposing step includes disposing the workpiece on a rotating plate, and the rotating plate includes a rotating axial position. The workpiece rotating step includes configuring a rotary driving member to rotate the rotating plate so as to synchronously rotate the workpiece. The image capturing step includes configuring a lighting unit to generate a light beam to illuminate the workpiece, and configuring an image capturing unit to receive the light beam and obtain a first workpiece blocking shadow area. The axial position calculating step includes configuring a central control unit to rotate the rotating plate and the workpiece through a rotational angle so as to obtain a second workpiece blocking shadow area via the image capturing unit. The central control unit calculates the first workpiece blocking shadow area and the second workpiece blocking shadow area to generate a pre-rotation distance parameter and a post-rotation distance parameter, and the central control unit calculates the pre-rotation distance parameter and the post-rotation distance parameter to generate a workpiece axial position which is an axial position of the workpiece. There is a distance between the rotating axial position and the workpiece axial position, and the distance is configured to judge whether the rotating axial position is aligned with the workpiece axial position.

Therefore, the image-measuring measuring method without axial alignment of the present disclosure utilizes a non-contact image measuring technique so as to accurately estimate the workpiece axial position of the workpiece. The workpiece can be arbitrarily placed or clamped on the rotating plate without axial alignment, thereby generating a characteristic size of the workpiece and accomplishing high convenience of measurement. Moreover, the present disclosure utilizes the image measuring technique without axial alignment so as to reduce the manpower and cost, and the accuracy is relatively high.

According to one embodiment, the axial position calculating step further includes a pre-rotation distance generating step and a post-rotation distance generating step. The pre-rotation distance generating step includes configuring the central control unit to determine a first pre-rotation virtual measuring line and a second pre-rotation virtual measuring line, and then the first pre-rotation virtual measuring line and the second pre-rotation virtual measuring line are calculated by the central control unit to generate a first pre-rotation distance and a second pre-rotation distance, respectively. The first pre-rotation distance and the second pre-rotation distance are combined into the pre-rotation distance parameter. The post-rotation distance generating step includes configuring the central control unit to determine a first post-rotation virtual measuring line and a second post-rotation virtual measuring line, and then the first post-rotation virtual measuring line and the second post-rotation virtual measuring line are calculated by the central control unit to generate a first post-rotation distance and a second post-rotation distance, respectively. The first post-rotation distance and the second post-rotation distance are combined into the post-rotation distance parameter. The post-rotation distance generating step is performed after the pre-rotation distance generating step. Furthermore, the axial position calculating step further includes a vertical edge line generating step. The vertical edge line generating step includes configuring the central control unit to calculate the first pre-rotation virtual measuring line, the second pre-rotation virtual measuring line, the first post-rotation virtual measuring line and the second post-rotation virtual measuring line to generate two edge line groups. Each of the two edge line groups includes two virtual vertical edge lines parallel to each other. One of the two edge line groups is tangent to a plurality of contour edge lines of the first workpiece blocking shadow area, and another of the two edge line groups is tangent to a plurality of contour edge lines of the second workpiece blocking shadow area. Moreover, the axial position calculating step further includes a virtual polygon generating step. The virtual polygon generating step includes configuring the central control unit to calculate a rotational number of the rotating plate. The rotational number, the first workpiece blocking shadow area and the second workpiece blocking shadow area are calculated by the central control unit to generate a plurality of edge line groups. Each of the edge line groups includes two virtual vertical edge lines parallel to each other. The edge line groups are connected to each other so as to form a virtual polygon. The virtual polygon, the pre-rotation distance parameter and the post-rotation distance parameter are calculated by the central control unit to generate the workpiece axial position which is the axial position of the workpiece.

BRIEF DESCRIPTION OF THE DRAWINGS

The present disclosure can be more fully understood by reading the following detailed description of the embodiment, with reference made to the accompanying drawings as follows:

FIG. 1 shows a schematic view of an image-measuring apparatus without axial alignment according to one embodiment of the present disclosure.

FIG. 2 shows a schematic side view of a workpiece displayed on a display device of a central control unit of FIG. 1.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Before describing any embodiments in detail, some terms used in the following are described. A first contour edge line $SL_{n1}$ represents a left contour edge line of a workpiece blocking shadow area $S_n$. A second contour edge line $SL_{n2}$ represents a right contour edge line of the workpiece blocking shadow area $S_n$. A first virtual measuring line $L_{n1}$ represents a left measuring line of the workpiece blocking shadow area $S_n$. A second virtual measuring line $L_{n2}$ represents a right measuring line of the workpiece blocking shadow area $S_n$. An edge distance $DLL_n$ represents a distance between the first contour edge line $SL_{n1}$ and the second contour edge line $SL_{n2}$. A rotational angle $\theta_n$ represents an angle of rotation of a rotating plate 200. A first distance $D_{n1}$ represents a distance between the first contour edge line $SL_{n1}$ and a virtual rotating axis 210. A second distance $D_{n2}$ represents a distance between the second contour edge line $SL_{n2}$ and the virtual rotating axis 210. A virtual vertical edge line $VL_n$ represents an edge line perpendicular to the first virtual measuring line $L_{n1}$ and the second virtual measuring line $L_{n2}$. When a rotational time n is a positive integer, the virtual vertical edge lines $VL_n$ can be connected each other to form a virtual polygon. The rotational time n may be 0 or the positive integer. When the rotational time n is 0, it represents "pre-rotation". When the rotational time n is the positive integer, it represents "n-th rotation of post-rotation". In addition, "with axial alignment" represents that a rotating axial position C is aligned with a workpiece axial position C', and "without axial alignment" represents that the rotating axial position C may be not aligned with the workpiece axial position C'. There is a distance $D_n$ between the rotating axial position C and the workpiece axial position C'.

Figure 3:
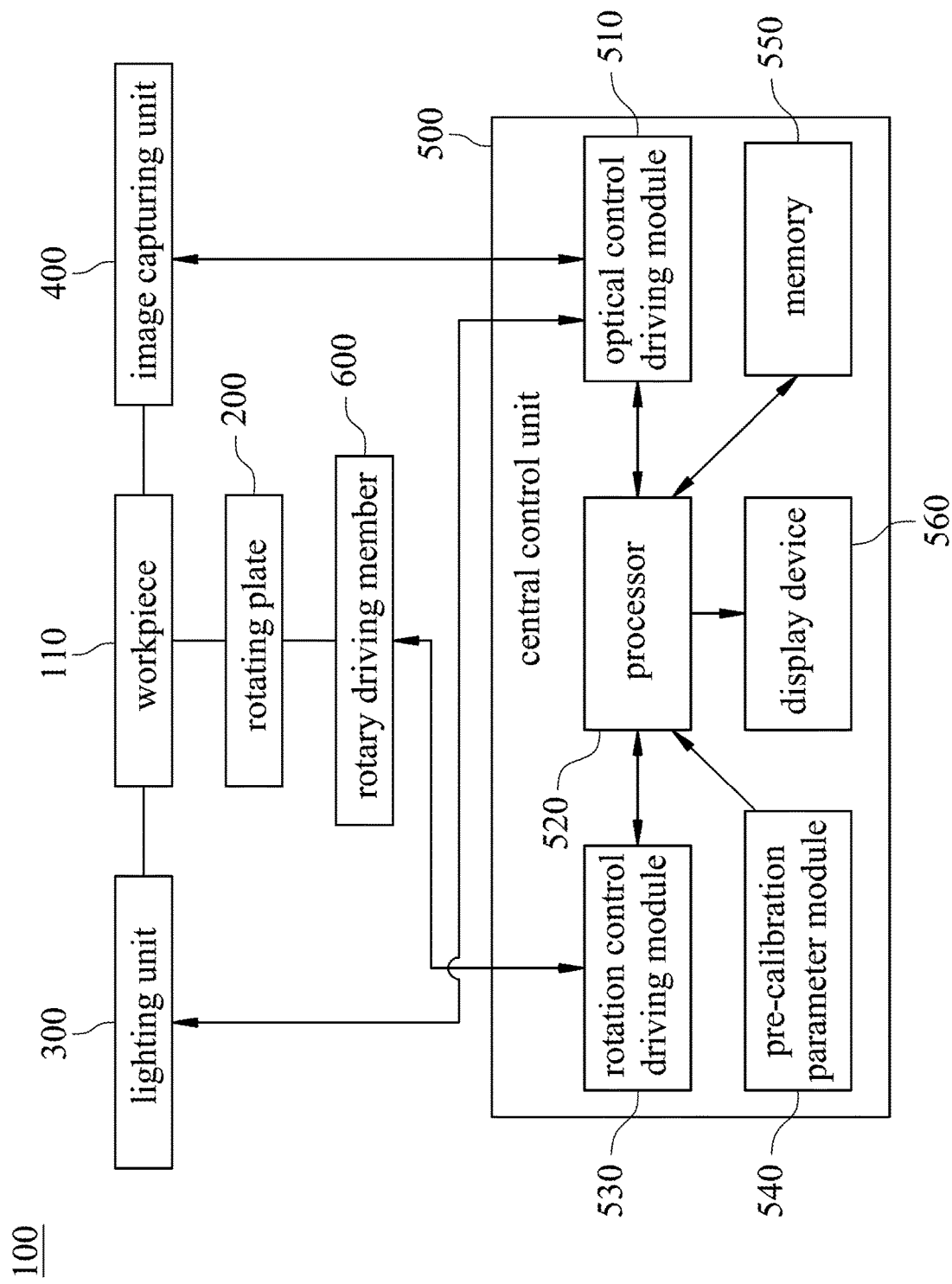
FIG. 3 shows a block diagram of the image-measuring apparatus without axial alignment of FIG. 1.

FIG. 1 shows a schematic view of an image-measuring apparatus 100 without axial alignment according to one embodiment of the present disclosure. FIG. 2 shows a schematic side view of a workpiece 110 displayed on a display device 560 of a central control unit 500 of FIG. 1. FIG. 3 shows a block diagram of the image-measuring apparatus 100 without axial alignment of FIG. 1. In FIGS. 1-3, the image-measuring apparatus 100 without axial alignment is configured to measure a contour of the workpiece 110 includes a rotating plate 200, a lighting unit 300, an image capturing unit 400, the central control unit 500 and a rotary driving member 600.

The rotating plate 200 includes the rotating axial position C, a virtual rotating axis 210 and a supporting surface 220. The workpiece 110 is disposed on the rotating plate 200. The virtual rotating axis 210 is perpendicular to an XY plane, i.e., parallel to a Z axis. The virtual rotating axis 210 is corresponding to the rotating axial position C. The supporting surface 220 is perpendicularly intersecting the virtual rotating axis 210 and parallel to the XY plane. The workpiece 110 is disposed on the supporting surface 220. In FIG. 1, the workpiece 110 is a shaft-shaped workpiece. The rotating plate 200 has a circular shape. The workpiece 110 includes a virtual workpiece axis 112 and the workpiece axial position C'. The rotating axial position C and the workpiece axial position C' are separated by the distance $D_n$. The virtual rotating axis 210 and the virtual workpiece axis 112 are separated by the distance $D_n$. When the distance $D_n$ is equal to 0, the workpiece 110 is axially aligned with the rotating plate 200. On the contrary, when the distance $D_n$ is greater than 0, the workpiece 110 is not axially aligned with the rotating plate 200. No matter what the distance $D_n$ is, the image-measuring apparatus 100 without axial alignment of the present disclosure can quickly and accurately estimating an axial position and a contour size of the workpiece 110.

The lighting unit 300 generates a light beam 310 traveling along an illumination path 320. The light beam 310 is a directional light source. The illumination path 320 passes through the workpiece 110. A horizontal illuminating range of the light beam 310 exceeds a width of the workpiece 110. In other words, the workpiece 110 does not completely block the light beam 310.

The image capturing unit 400 is disposed on the illumination path 320 to receive the light beam 310. The workpiece 110 blocks a part of the light beam 310 so as to form the workpiece blocking shadow area $S_n$ and two side blank areas 410 on the image capturing unit 400. Because the light beam 310 is the directional light source, and the horizontal illuminating range of the light beam 310 exceeds the width of the workpiece 110, a shape of the workpiece blocking shadow area $S_n$ is corresponding to a contour of the workpiece 110. In detail, the workpiece blocking shadow area $S_n$ can exhibit different contours of the workpiece 110 according to the rotating plate 200 sequentially rotated through different rotational angles $\theta_n$. The rotational angle $\theta_n$ represents an angle of an nth rotation of the rotating plate 200. The rotational time n may be 0 or the positive integer. The workpiece blocking shadow area $S_n$ represents a blocking shadow area of the workpiece 110 at the rotational angle $\theta_n$. For example, before starting to rotate the rotating plate 200 (i.e., pre-rotation, and the rotational angle $\theta_0$ is equal to 0), an image captured by the image capturing unit 400 includes a first workpiece blocking shadow area $S_0$. When the rotating plate 200 is rotated through a first rotational angle $\theta_1$ at a first rotation (i.e., post-rotation), the image captured by the image capturing unit 400 includes a second workpiece blocking shadow area $S_1$. When the rotating plate 200 is rotated through a second rotational angle $\theta_2$ at a second rotation, the image captured by the image capturing unit 400 includes a third workpiece blocking shadow area $S_2$, and so on. The image capturing unit 400 of the present disclosure may be a high-resolution digital camera.

The rotary driving member 600 is connected to the rotating plate 200. The rotary driving member 600 is controlled by the central control unit 500 to rotate the rotating plate 200 so as to synchronously rotate the workpiece 100. The rotary driving member 600 of the present disclosure may be an electric motor which is controlled by the central control unit 500 to accurately rotate the rotating plate 200 through the rotational angle $\theta_n$. In addition, the rotational angle $\theta_n$ is greater than 0 degrees and less than 180 degrees. A magnitude of the rotational angle $\theta_n$ can be determined according to the needs of a user.

The central control unit 500 is signally connected to the lighting unit 300, the image capturing unit 400 and the rotary driving member 600. The central control unit 500 is signally connected to the rotating plate 200 indirectly. The rotating plate 200 and the workpiece 110 are rotated through the rotational angle $\theta_n$ by the central control unit 500 so as to form the workpiece blocking shadow area $S_n$ on the image capturing unit 400. The central control unit 500 calculates the first workpiece blocking shadow area $S_0$ before rotating and the workpiece blocking shadow area(s) $S_n$ after rotating (the rotational time n is equal to or greater than 1) to generate a pre-rotation distance parameter and a post-rotation distance parameter. The central control unit 500 calculates the pre-rotation distance parameter and the post-rotation distance parameter to generate the workpiece axial position C' which is the axial position of the workpiece 110. There is a distance $D_n$ between the rotating axial position C and the workpiece axial position C', and the distance $D_n$ is configured to judge whether the rotating axial position C is aligned with the workpiece axial position C'. In detail, the central control unit 500 includes an optical control driving module 510, a processor 520, a rotation control driving module 530, a pre-calibration parameter module 540, a memory 550 and a display device 560. The optical control driving module 510 is signally connected to the processor 520, the lighting unit 300 and the image capturing unit 400. The lighting unit 300 and the image capturing unit 400 are controlled by the optical control driving module 510 to control the light beam 310 and the illumination path 320. The image captured by the image capturing unit 400 is transmitted to the processor 520 via the optical control driving module 510 so as to perform subsequent image processing operations. The image includes the workpiece blocking shadow area $S_n$ and the two side blank areas 410. Moreover, the rotation control driving module 530 is signally connected to the processor 520 and the rotary driving member 600. The processor 520 transmits a control command to the rotary driving member 600 via the rotation control driving module 530, so that the rotating plate 200 and the workpiece 110 are synchronously rotated through the rotational angle $\theta_n$ by the rotary driving member 600. The pre-calibration parameter module 540 is signally connected to the processor 520 and stores a plurality of pre-calibration parameters. The pre-calibration parameters include a camera parameter of the image capturing unit 400 and a coordinate position of the virtual rotating axis 210, which can be calibrated in advance. The pre-calibration parameters are used to accurately calculate the contour size of the workpiece 110. The memory 550 is signally connected to the processor 520 and accesses data from the optical control driving module 510, the processor 520, the rotation control driving module 530, the pre-calibration parameter module 540 and the display device 560 for subsequent size analysis. The display device 560 displays a measurement image and a manipulation interface, so that the user can smoothly complete the measurement of the workpiece 110. When measuring the workpiece 110 by the image-measuring apparatus 100 without axial alignment of the present disclosure, the workpiece 110 is arbitrarily placed on the rotating plate 200, and an axial direction of the workpiece 110 is maintained perpendicular to an optically axial direction of the light beam 310. Then, the rotation control driving module 530 controls the rotating plate 200 to be rotated through the rotational angle $\theta_n$ and configures the lighting unit 300 and the image capturing unit 400 to capture an image and detect contour edge lines of the workpiece 110. Finally, the central control unit 500 calculates the image and the contour edge lines to generate the workpiece axial position C' which is the axial position of the workpiece 110. The distance $D_n$ is greater than or equal to 0 and less than a radius of the rotating plate 200. One or more specific embodiments of the present disclosure will be described below.

Figure 4B:
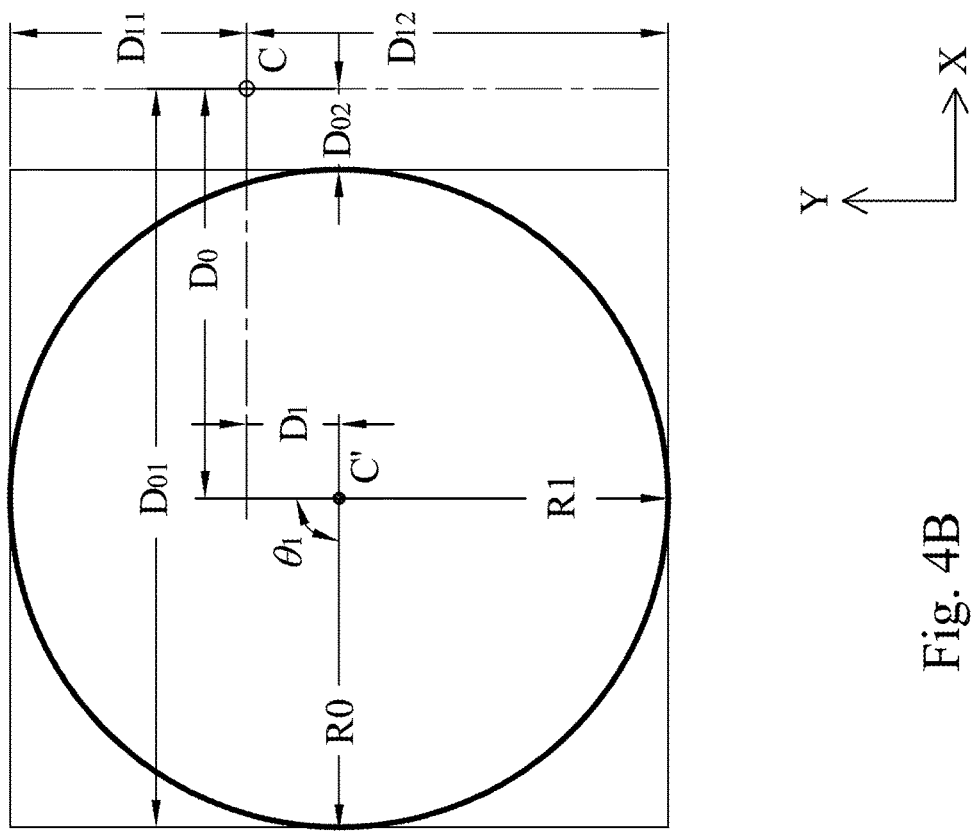
FIG. 4B shows a schematic view of the workpiece axial position according to a second example of the present disclosure.
Figure 4A:
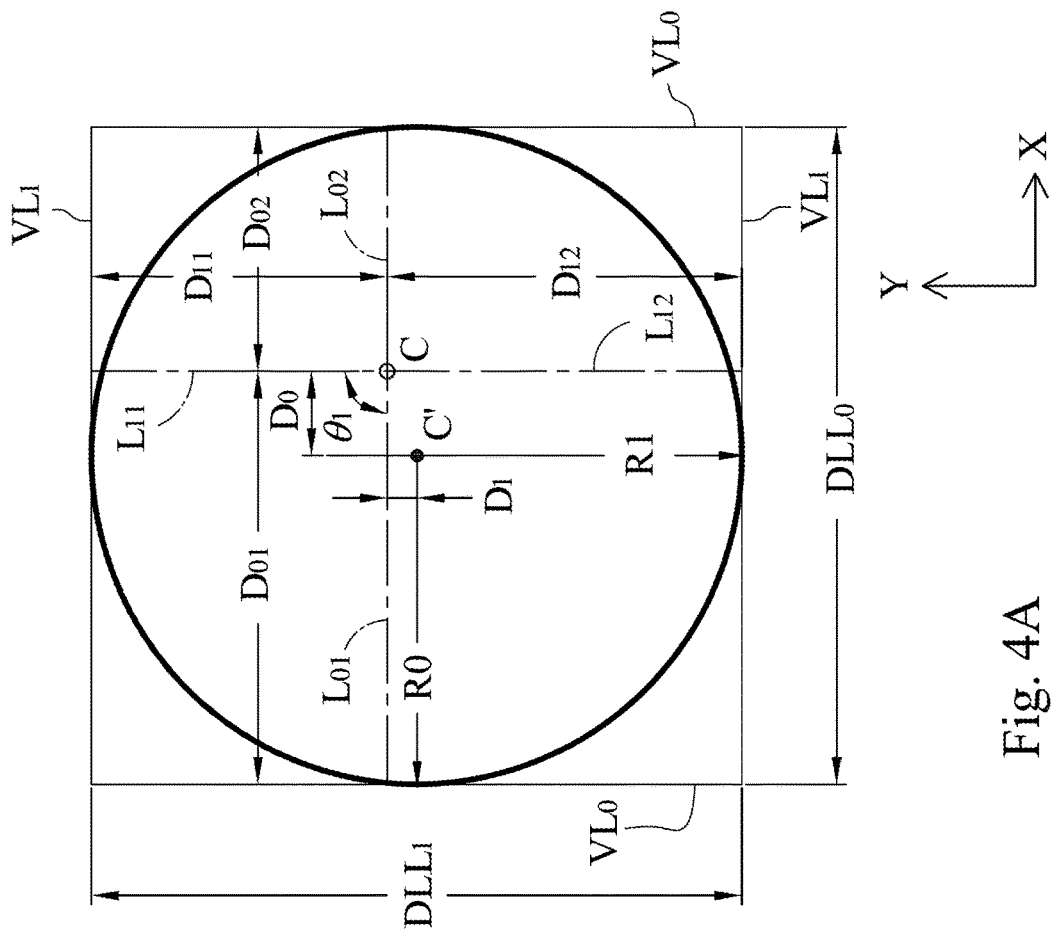
FIG. 4A shows a schematic view of a workpiece axial position according to a first example of the present disclosure.

FIG. 4A shows a schematic view of the workpiece axial position C' according to a first example of the present disclosure. In FIGS. 1, 2 and 4A, the first example of the present disclosure utilizes one rotation to measure the roundness of the workpiece 110 having a regularly cylindrical shape. In other words, a number of rotations of the rotating plate 200 reaches a rotational number, and the rotational number is equal to 1. When the workpiece 110 is arbitrarily placed on the rotating plate 200, the workpiece axial position C' of the workpiece 110 is not aligned with the rotating axial position C of the rotating plate 200. In order to measure the roundness of the workpiece 110, the workpiece axial position C' must be found. First, in the position where the rotational angle $\theta_0$ is equal to 0, the lighting unit 300 and the image capturing unit 400 are configured to detect the first workpiece blocking shadow area $S_0$ of the workpiece 110 having the regularly cylindrical shape. A first pre-rotation contour edge line $SL_{01}$ and a second pre-rotation contour edge line $SL_{02}$ are obtained from a left edge and a right edge of the first workpiece blocking shadow area $S_0$, respectively. The first pre-rotation contour edge line $SL_{01}$, the second pre-rotation contour edge line $SL_{02}$ and the virtual rotating axis 210 are calculated to generate a first pre-rotation distance $D_{01}$ and a second pre-rotation distance $D_{02}$. The first pre-rotation distance $D_{01}$ represents the distance between the first pre-rotation contour edge line $SL_{01}$ and the virtual rotating axis 210. The second pre-rotation distance $D_{02}$ represents the distance between the second pre-rotation contour edge line $SL_{02}$ and the virtual rotating axis 210. A first edge line group having two virtual vertical edge lines $VL_n$ parallel to each other (i.e., two pre-rotation virtual vertical edge lines $VL_0$) is generated in the 0-degree direction of the rotating axial position C. Then, the rotating plate 200 is rotated through the first rotational angle $\theta_1$ around the rotating axial position C so as to detect the first contour edge line ($SL_{11}$) and the second contour edge line ($SL_{12}$) of the workpiece 110 having the regularly cylindrical shape. The first rotational angle $\theta_1$ is equal to 90 degrees. The first contour edge line ($SL_{11}$), the second contour edge line ($SL_{12}$) and the rotating axial position C are calculated to generate a first post-rotation distance $D_{11}$ and a second post-rotation distance $D_{12}$. A second edge line group having two virtual vertical edge lines $VL_n$ parallel to each other (i.e., two post-rotation virtual vertical edge lines $VL_1$) is generated in the 90-degree direction of the rotating axial position C. The first edge line group and the second edge line group can form a rectangle and can be calculated to obtain a centroid of the rectangle regarded as the workpiece axial position C'. Finally, the workpiece axial position C', the pre-rotation virtual vertical edge lines $VL_0$ and the post-rotation virtual vertical edge lines $VL_1$ are calculated to generate a first radius $R_0$ of an inscribed circle and a second radius $R_1$ of the inscribed circle. The first radius $R_0$ and the second radius $R_1$ of the inscribed circle are compared to obtain the roundness of the workpiece 110. In addition, when the workpiece 110 has a regularly columnar shape (e.g., an elliptical prism, a triangular prism, a parallel quadrangular prism, a hexagonal prism, etc.), the rotational time n of the rotational angle $\theta_n$ of the rotating plate 200 does not need to be too large as long as a vertical distance between the rotating axial position C and an opposite side or an opposite angle can be obtained for generating a virtual polygon. The centroid of the virtual polygon (i.e., the workpiece axial position C') is close to an actual workpiece axis of the workpiece 110.

In FIGS. 2 and 4A, each of the first workpiece blocking shadow area $S_0$ and the second workpiece blocking shadow area $S_1$ is disposed between the two side blank areas 410. The first workpiece blocking shadow area $S_0$ includes a first pre-rotation contour edge line $SL_{01}$ (i.e., the rotational time n of the first contour edge line $SL_{n1}$ is equal to 0), a second pre-rotation contour edge line $SL_{02}$ (i.e., the rotational time n of the second contour edge line $SL_{n2}$ is equal to 0), a first pre-rotation virtual measuring line $L_{01}$ (i.e., the rotational time n of the first virtual measuring line $L_{n1}$ is equal to 0) and a second pre-rotation virtual measuring line $L_{02}$ (i.e., the rotational time n of the second virtual measuring line $L_{n2}$ is equal to 0). When the virtual rotating axis 210 falls within a cross-sectional range of the workpiece 110, the first pre-rotation contour edge line $SL_{01}$ is located at one side of the virtual rotating axis 210, and the second pre-rotation contour edge line $SL_{02}$ is located at another side of the virtual rotating axis 210. The second pre-rotation contour edge line $SL_{02}$ is separated from the first pre-rotation contour edge line $SL_{01}$ by a pre-rotation edge distance $DLL_0$ (i.e., the rotational time n of the edge distance $DLL_n$ is equal to 0). Furthermore, the first pre-rotation virtual measuring line $L_{01}$ is parallel to the XY plane. The first pre-rotation virtual measuring line $L_{01}$ has the first pre-rotation distance $D_{01}$ between the first pre-rotation contour edge line $SL_{01}$ and the virtual rotating axis 210. The second pre-rotation virtual measuring line $L_{02}$ is linked to the first pre-rotation virtual measuring line $L_{01}$. The second pre-rotation virtual measuring line $L_{02}$ is parallel to the XY plane. The second pre-rotation virtual measuring line $L_{02}$ has a second pre-rotation distance $D_{02}$ between the second pre-rotation contour edge line $SL_{02}$ and the virtual rotating axis 210. The first pre-rotation virtual measuring line $L_{01}$ and the second pre-rotation virtual measuring line $L_{02}$ are calculated by the central control unit 500 to generate the first pre-rotation distance $D_{01}$ and the second pre-rotation distance $D_{02}$, respectively. In other words, the central control unit 500 calculates the first workpiece blocking shadow area $S_0$ to generate a pre-rotation distance parameter. The pre-rotation distance parameter includes the first pre-rotation distance $D_{01}$ and the second pre-rotation distance $D_{02}$, and the pre-rotation edge distance $DLL_0$ is a sum of the first pre-rotation distance $D_{01}$ and the second pre-rotation distance $D_{02}$. The rotating axial position C is a rotational center of the rotating plate 200 and represents an intersection point between the virtual rotating axis 210 and the first pre-rotation virtual measuring line $L_{01}$. The rotating axial position C also represents a connecting point between the first pre-rotation virtual measuring line $L_{01}$ and the second pre-rotation virtual measuring line $L_{02}$. Then, the central control unit 500 calculates the first pre-rotation virtual measuring line $L_{01}$ and the second pre-rotation virtual measuring line $L_{02}$ to generate two virtual vertical edge lines $VL_0$ parallel to each other. The two virtual vertical edge lines $VL_0$ are perpendicular to the first pre-rotation virtual measuring line $L_{01}$ and the second pre-rotation virtual measuring line $L_{02}$, respectively. The two virtual vertical edge lines $VL_0$ are tangent to the first pre-rotation contour edge line $SL_{01}$ and the second pre-rotation contour edge line $SL_{02}$, respectively. For the same reason, a shape of the second workpiece blocking shadow area $S_1$ is corresponding to a contour of the workpiece 110, and the second workpiece blocking shadow area $S_1$ includes a first post-rotation contour edge line $SL_{11}$, a second post-rotation contour edge line $SL_{12}$, a first post-rotation virtual measuring line $L_{11}$ and a second post-rotation virtual measuring line $L_{12}$. The first post-rotation contour edge line $SL_{11}$ is located at one side of the virtual rotating axis 210, and the second post-rotation contour edge line $SL_{12}$ is located at another side of the virtual rotating axis 210. The second post-rotation contour edge line $SL_{12}$ is separated from the first post-rotation contour edge line $SL_{11}$ by a post-rotation edge distance $DLL_1$. The first post-rotation virtual measuring line $L_{11}$ is parallel to the XY plane. The first post-rotation virtual measuring line $L_{11}$ has the first post-rotation distance $D_{11}$ between the first post-rotation contour edge line $SL_{11}$ and the virtual rotating axis 210. The second post-rotation virtual measuring line $L_{12}$ is linked to the first post-rotation virtual measuring line $L_{11}$. The second post-rotation virtual measuring line $L_{12}$ is parallel to the XY plane. The second post-rotation virtual measuring line $L_{12}$ has the second post-rotation distance $D_{12}$ between the second post-rotation contour edge line $SL_{12}$ and the virtual rotating axis 210. In addition, the first post-rotation virtual measuring line $L_{11}$ and the second post-rotation virtual measuring line $L_{12}$ are calculated by the central control unit 500 to generate the first post-rotation distance $D_{11}$ and the second post-rotation distance $D_{12}$, respectively. In other words, the central control unit 500 calculates the second workpiece blocking shadow area $S_1$ to generate a post-rotation distance parameter. The post-rotation distance parameter includes the first post-rotation distance $D_{11}$ and the second post-rotation distance $D_{12}$, and the post-rotation edge distance $DLL_1$ is a sum of the first post-rotation distance $D_{11}$ and the second post-rotation distance $D_{11}$. As can be seen from the above, the rotational number, the first workpiece blocking shadow area $S_0$ and the second workpiece blocking shadow area $S_1$ are calculated by the central control unit 500 to generate two edge line groups, and each of the two edge line groups includes two virtual vertical edge lines $VL_n$ parallel to each other. The two edge line groups are connected to each other so as to form a virtual rectangle. The virtual rectangle, the pre-rotation distance parameter and the post-rotation distance parameter are calculated by the central control unit 500 to generate the workpiece axial position C' which is the axial position of the workpiece 110. Therefore, the roundness of the workpiece 110 can be obtained according to the workpiece axial position C', the first radius $R_0$ of the inscribed circle and the second radius $R_1$ of the inscribed circle so as to be convenient, fast, accurate and efficient. Moreover, the distance $D_0$ represents a space between the workpiece axial position C' and the rotating axial position C in the X direction before rotating. The distance $D_1$ represents a space between the workpiece axial position C' and the rotating axial position C in the Y direction after rotating. The distances $D_0$, $D_1$ are configured to judge whether the rotating axial position C is aligned with the workpiece axial position C'.

FIG. 4B shows a schematic view of the workpiece axial position C' according to a second example of the present disclosure. In FIGS. 1, 2 and 4B, the second example of the present disclosure utilizes one rotation to measure the roundness of the workpiece 110 having a regularly cylindrical shape when the rotating axial position C is located outside the workpiece 110. In other words, the rotational number of the rotating plate 200 is equal to 1, so that two radiuses of the inscribed circle can be obtained. The two radiuses of the inscribed circle are a first radius $R_0$ of the inscribed circle and a second radius $R_1$ of the inscribed circle, respectively. In order to measure the roundness of the workpiece 110, the workpiece axial position C' must be found. First, in the position where the rotational angle $\theta_0$ is equal to 0, the lighting unit 300 and the image capturing unit 400 are configured to detect the first pre-rotation distance $D_{01}$ between the left contour edge line (i.e., the first pre-rotation contour edge line $SL_{01}$) and the virtual rotating axis 210. The lighting unit 300 and the image capturing unit 400 are configured to detect the second pre-rotation distance $D_{02}$ between the right contour edge line (i.e., the second pre-rotation contour edge line $SL_{02}$) and the virtual rotating axis 210. The left contour edge line and the right contour edge line of the workpiece 110 are both located at the same side of the rotating axial position C. Then, the rotating plate 200 is rotated through the first rotational angle $\theta_1$ around the rotating axial position C so as to detect the first contour edge line ($SL_{11}$) and the second contour edge line ($SL_{12}$) of the workpiece 110 having the regularly cylindrical shape. The first rotational angle $\theta_1$ is equal to 90 degrees. The first contour edge line ($SL_{11}$), the second contour edge line ($SL_{12}$) and the rotating axial position C are calculated to generate a first post-rotation distance $D_{11}$ and a second post-rotation distance $D_{12}$. At this time, the left contour edge line and the right contour edge line of the workpiece 110 are located at two sides of the rotating axial position C, respectively, i.e., the rotating axial position C is located between the left contour edge line and the right contour edge line. Finally, the first edge line group and the second edge line group can form a rectangle and can be calculated to obtain a centroid of the rectangle regarded as the workpiece axial position C'. A first radius $R_0$ and a second radius $R_1$ of an inscribed circle may be generated, and the first radius $R_0$ and the second radius $R_1$ of the inscribed circle are compared to obtain the roundness of the workpiece 110. As can be seen from the above, no matter what position relative to the workpiece 110 the rotational axis position C is at, the present disclosure can quickly and accurately estimate the workpiece axial position C' and obtain the roundness of the workpiece 110, so that the workpiece 110 may be arbitrarily placed on the rotating plate 200 to greatly increase convenience of measurement.

Figure 4D:
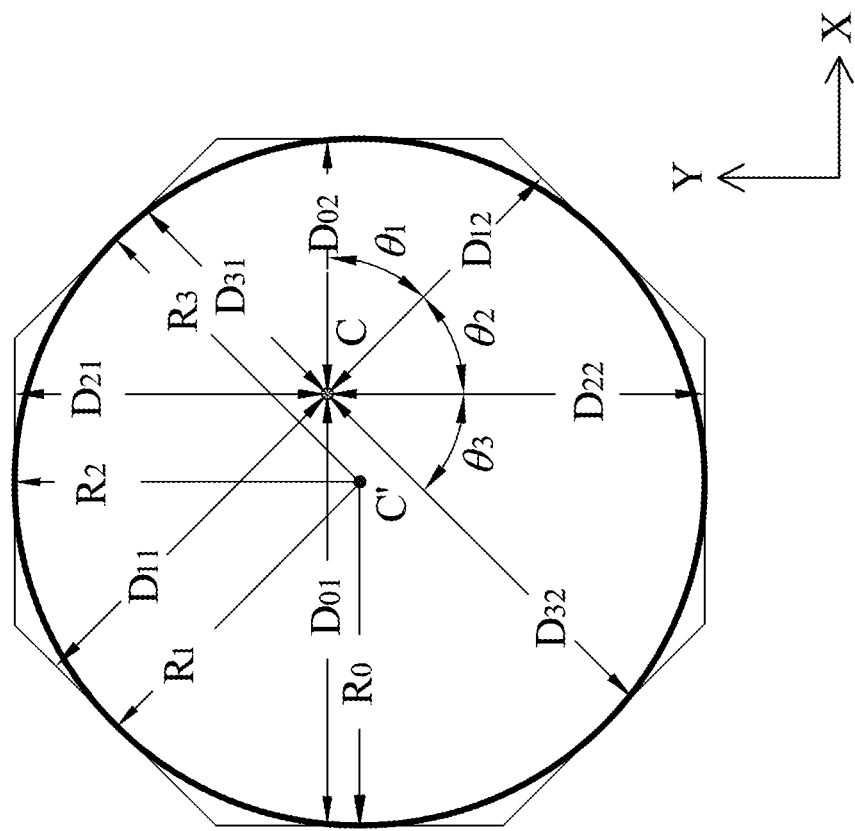
FIG. 4D shows a schematic view of the workpiece axial position according to a fourth example of the present disclosure.
Figure 4C:
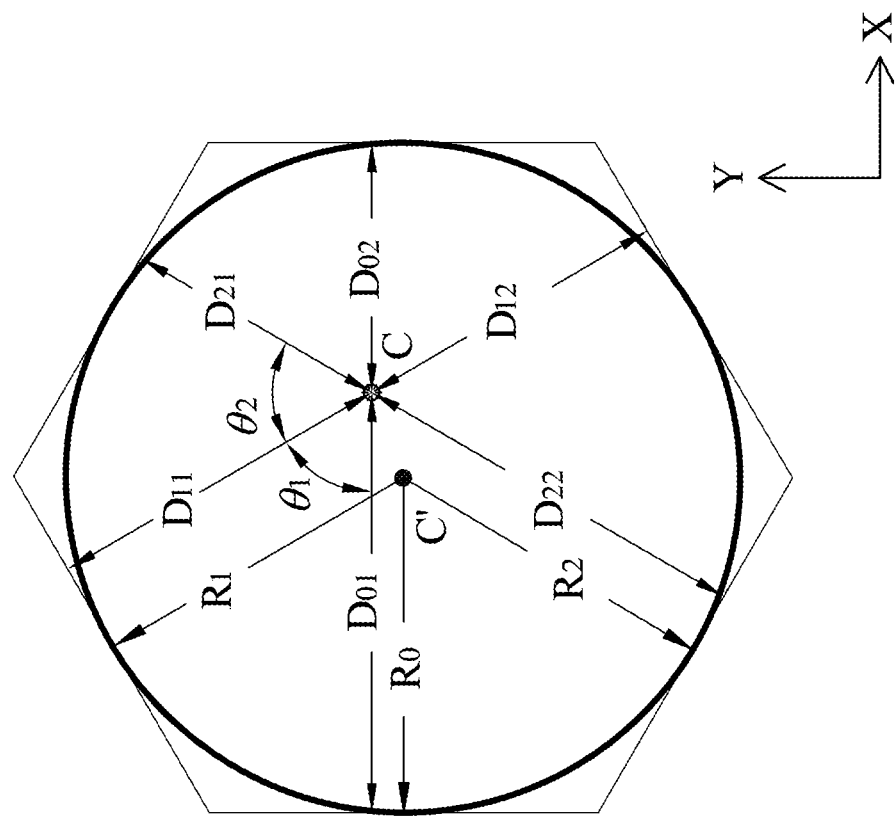
FIG. 4C shows a schematic view of the workpiece axial position according to a third example of the present disclosure.

FIG. 4C shows a schematic view of the workpiece axial position C' according to a third example of the present disclosure. FIG. 4D shows a schematic view of the workpiece axial position C' according to a fourth example of the present disclosure. In FIGS. 1, 2 and 4A-4D, the third example of the present disclosure utilizes two rotations to measure the roundness of the workpiece 110 having a regularly cylindrical shape. In other words, the rotational number of the rotating plate 200 is equal to 2, so that three radiuses of the inscribed circle can be obtained in the third example. The three radiuses of the inscribed circle are a first radius $R_0$ of the inscribed circle, a second radius $R_1$ of the inscribed circle and a third radius $R_2$ of the inscribed circle, respectively. The first virtual measuring line $L_{n1}$ and the second virtual measuring line $L_{n2}$ are calculated to generate a virtual hexagon by the central control unit 500. The rotational time n is 0, 1 or 2. Hence, the roundness can be measured via the first rotational angle $\theta_1$ and the second rotational angle $\theta_2$. The first rotational angle $\theta_1$ and the second rotational angle $\theta_2$ are both equal to 60 degrees, as shown in FIG. 4C. Consequently, the larger the rotational time n is, the more accurate the roundness is. If the rotating plate 200 is rotated three times, i.e., the rotational number is equal to 3, the corresponding rotational angles $\theta_1$, $\theta_2$, $\theta_3$ are all equal to 45 degrees. The first distance $D_{n1}$ and the second distance $D_{n2}$ are calculated to generate a virtual octagon by the central control unit 500. The rotational time n is 0, 1, 2 or 3. Then, four radiuses of the inscribed circle can be obtained by the central control unit 500. The four radiuses of the inscribed circle are a first radius $R_0$ of the inscribed circle, a second radius $R_1$ of the inscribed circle, a third radius $R_2$ of the inscribed circle and a fourth radius $R_3$ of the inscribed circle, respectively, as shown in FIG. 4D, and the rest can be deduced by analogy. Therefore, the roundness of the workpiece 110 can be obtained by comparing the four radiuses of the inscribed circle.

Figure 5A:
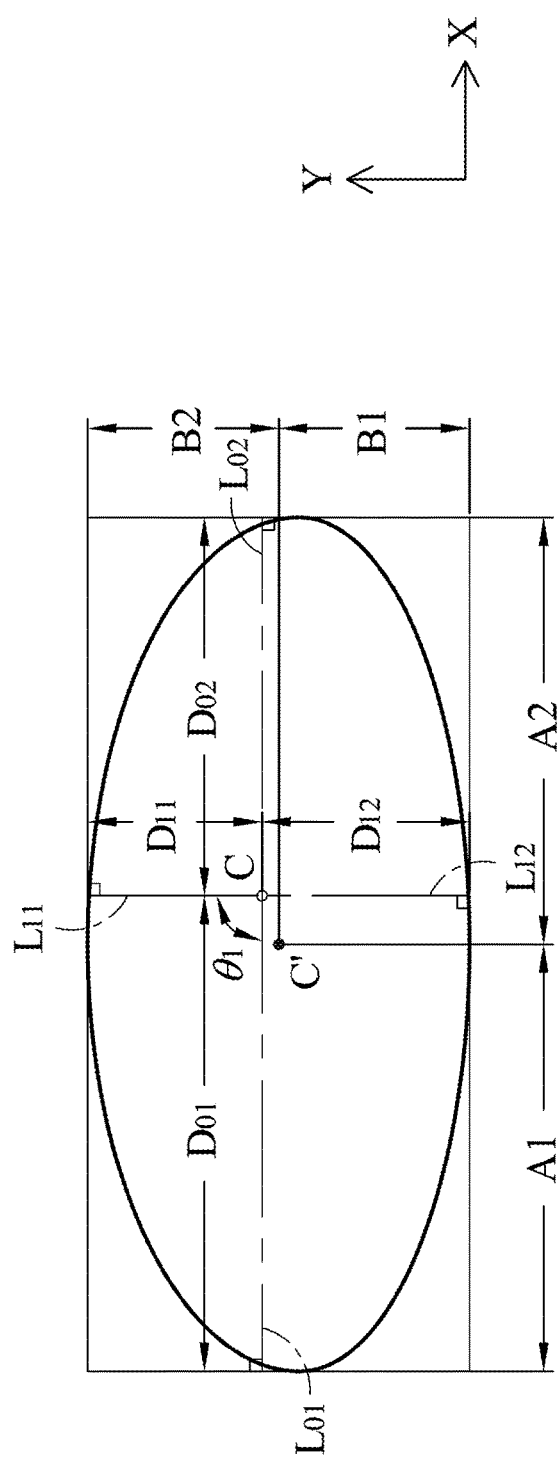
FIG. 5A shows a schematic view of the workpiece axial position according to a fifth example of the present disclosure.
Figure 5B:
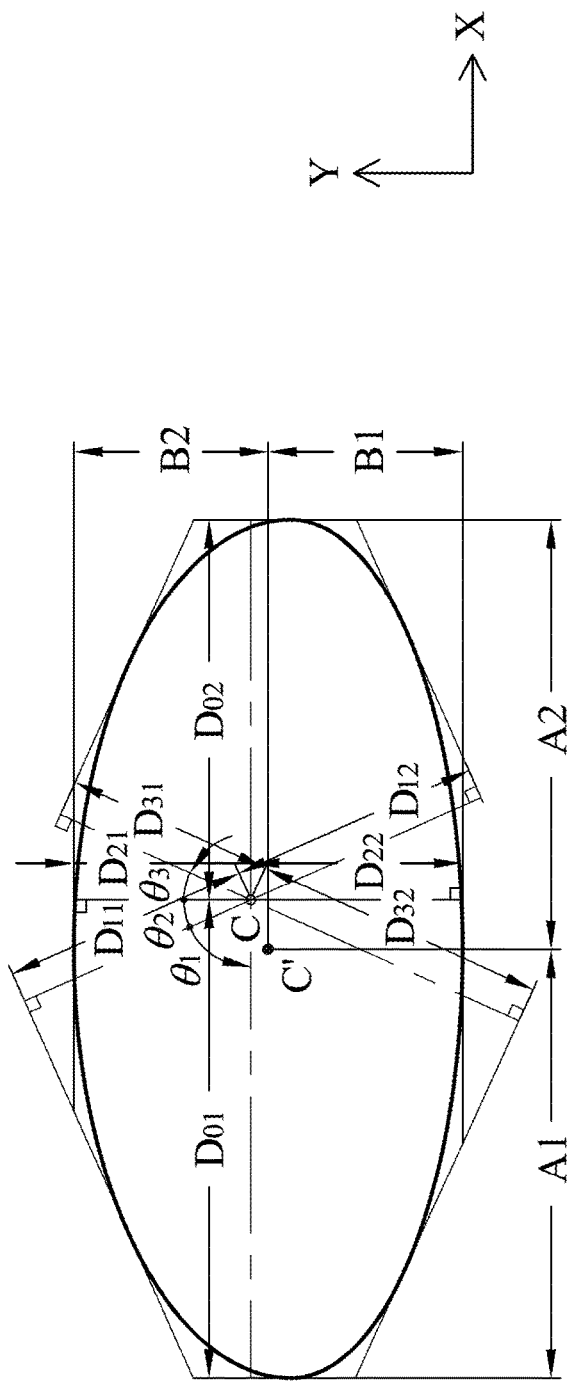
FIG. 5B shows a schematic view of the workpiece axial position according to a sixth example of the present disclosure.

Referring to FIGS. 1, 2, 5A and 5B, FIG. 5A shows a schematic view of the workpiece axial position C' according to a fifth example of the present disclosure. FIG. 5B shows a schematic view of the workpiece axial position C' according to a sixth example of the present disclosure. The workpiece 110 has an elliptical shape. In FIG. 5A, the rotational number of the rotating plate 200 is equal to 1, and the first rotational angle $\theta_1$ is equal to 90 degrees. The central control unit 500 can generate two edge line groups, and each of the two edge line groups includes two tangent lines parallel to each other (i.e., the virtual vertical edge lines $VL_n$). The two edge line groups form a virtual parallelogram or a virtual rectangle. The first distance $D_{n1}$ and the second distance $D_{n2}$ are calculated to obtain the workpiece axial position C' of the workpiece 110 having the elliptical shape and a plurality of characteristic sizes A1, A2, B1, B2 of the elliptical shape. In addition, in FIG. 5B, the rotational number of the rotating plate 200 is equal to 3, and the corresponding rotational angles $\theta_1$, $\theta_2$, $\theta_3$ are equal to 60 degrees, 30 degrees, 30 degrees, respectively. The central control unit 500 can generate fourth edge line groups, and each of the fourth edge line groups includes two tangent lines parallel to each other. The fourth edge line groups form a virtual octagon which is closer to the elliptical shape of the workpiece 110, so that the workpiece axial position C' closer to a real workpiece axis can be obtained. The characteristic sizes A1, A2, B1, B2 of the elliptical shape can be further measured from the workpiece axial position C'. Accordingly, the image-measuring apparatus 100 without axial alignment of the present disclosure configures the rotating plate 200 to be rotated through at least one rotational angle $\theta_1$ so as to obtain a centroid of any cross-sectional shape, i.e., the workpiece axial position C'.

Figure 6:
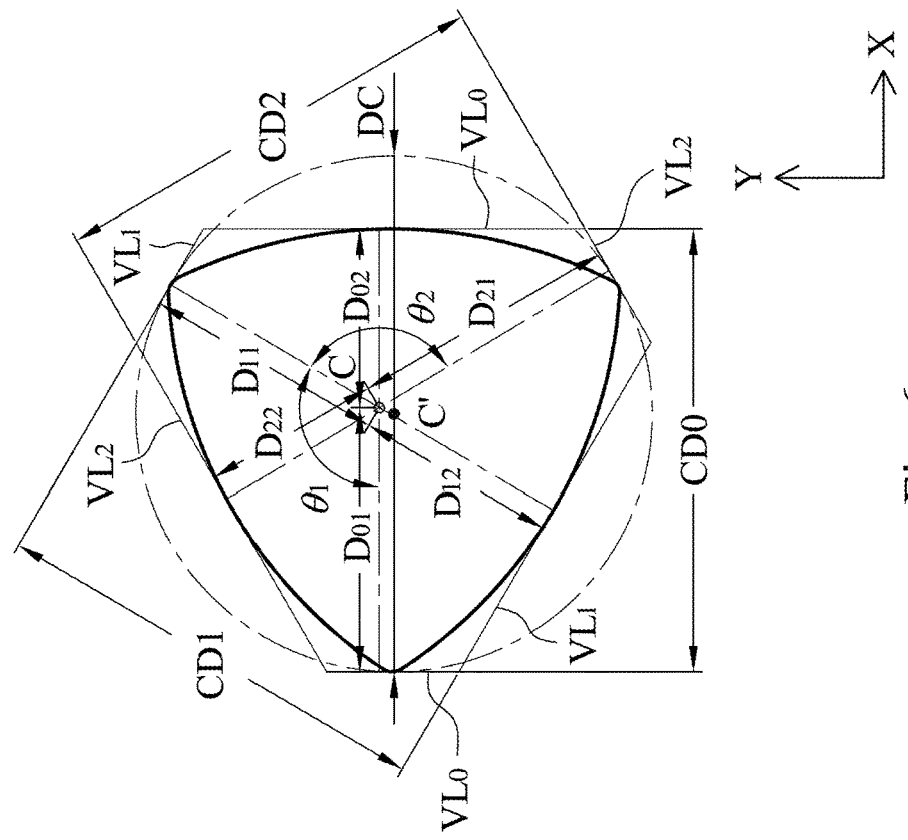
FIG. 6 shows a schematic view of the workpiece axial position according to a seventh example of the present disclosure.

FIG. 6 shows a schematic view of the workpiece axial position C' according to a seventh example of the present disclosure. In FIGS. 1, 2 and 6, the workpiece 110 is a triangular thread screw having a triangular arc shape in cross section. First, the rotating plate 200, the lighting unit 300, the image capturing unit 400, the central control unit 500 and the rotary driving member 600 are manipulated to search a position of the rotating plate 200 at which the edge distance $DLL_n$ has a largest or smallest value (the edge distance $DLL_n$ having the largest or smallest value is selected according to a radian of the triangular arc shape). The rotational angle $\theta_0$ is equal to 0. Two parallel edge lines of a first edge line group (i.e., the virtual vertical edge lines $VL_n$ where the rotational time n is equal to 0) and the rotating axial position C are separated by a first distance $D_{n1}$ and a second distance $D_{n2}$, respectively, and the rotational time n is equal to 0. Then, the rotating plate 200 is rotated through about 120 degrees. Two parallel edge lines of a second edge line group (i.e., the virtual vertical edge lines $VL_n$ where the rotational time n is equal to 1) are generated by the central control unit 500. The two parallel edge lines of the second edge line group and the rotating axial position C are separated by the first distance $D_{n1}$ and the second distance $D_{n2}$, respectively, and the rotational time n is equal to 1. Finally, the rotating plate 200 is further rotated through about 120 degrees. Two parallel edge lines of a third edge line group (i.e., the virtual vertical edge lines $VL_n$ where the rotational time n is equal to 2) are generated. The two parallel edge lines of the third edge line group and the rotating axial position C are separated by the first distance $D_{n1}$ and the second distance $D_{n2}$, respectively, and the rotational time n is equal to 2. The first edge line group, the second edge line group and the third edge line group are connected to each other so as to form a virtual hexagon. The central control unit 500 can not only generate a centroid of the virtual hexagon, i.e., the workpiece axial position C', but also obtain the distance $D_n$ between the workpiece axial position C' and the rotating axial position C. Then, the centroid of the virtual hexagon is calculated to generate a diameter DC of a circumscribed circle and three midline lengths CD0, CD1, CD2 of the triangular thread screw. Therefore, when using the image-measuring apparatus 100 without axial alignment of the present disclosure to measure the triangular thread screw, the triangular thread screw can be arbitrarily placed on the rotating plate 200 without axial alignment between the rotating axial position C and the workpiece axial position C' of the workpiece 110. The image-measuring apparatus 100 without axial alignment of the present disclosure can quickly and accurately estimate the diameter DC of the circumscribed circle and the three midline lengths CD0, CD1, CD2 of the triangular thread screw via the rotational angle $\theta_n$ and related parameters (such as the first distance $D_{n1}$, the second distance $D_{n2}$, etc.), thereby knowing whether or not the triangular thread screw meets the required specifications. It is very suitable for the measurement requirements of a large number of workpieces.

Figure 7:
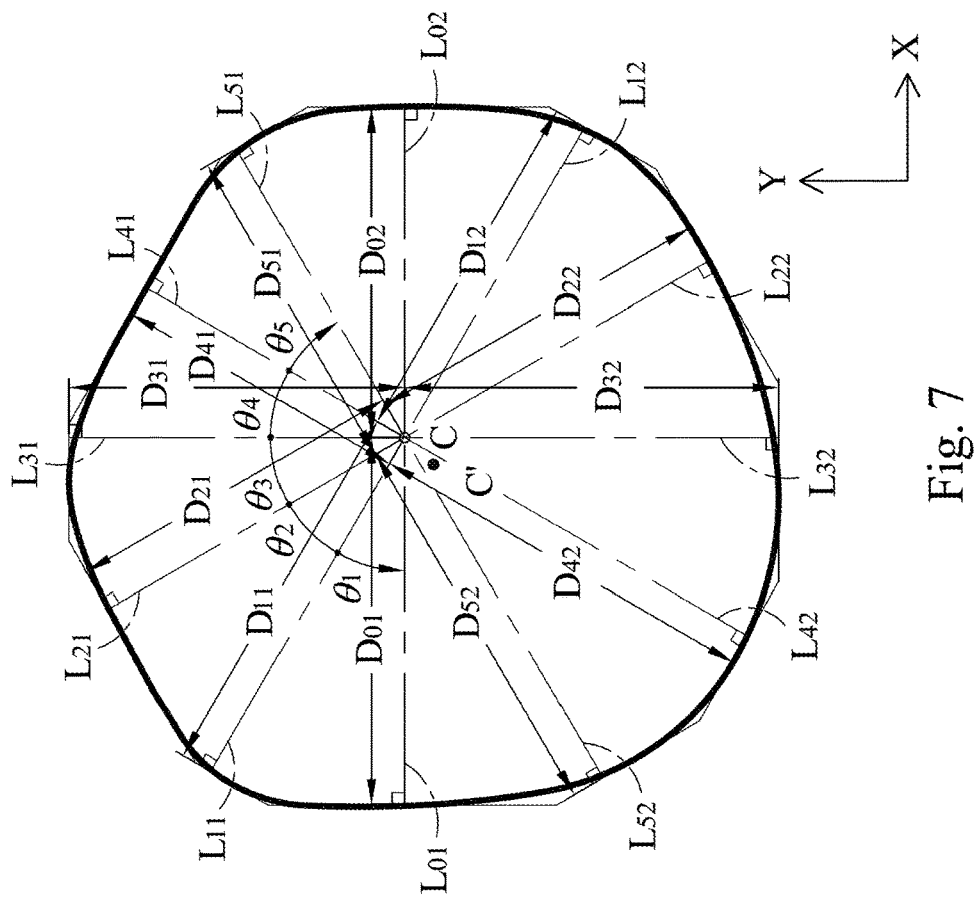
FIG. 7 shows a schematic view of the workpiece axial position according to an eighth example of the present disclosure.

FIG. 7 shows a schematic view of the workpiece axial position C' according to an eighth example of the present disclosure. In FIGS. 1, 2 and 7, the workpiece 110 has an irregularly shaped polygon in cross section. The rotational number of the rotating plate 200 is equal to 5, and the corresponding rotational angles $\theta_1$, $\theta_2$, $\theta_3$, $\theta_4$, $\theta_5$ are all equal to 30 degrees. The central control unit 500 can generate six virtual measuring lines $L_{n1}$, six virtual measuring lines $L_{n2}$, six distances $D_{n1}$, six distances $D_{n2}$ (the rotational time n is equal to 0, 1, 2, 3, 4 or 5) and six edge line groups, and each of the six edge line groups includes two tangent lines parallel to each other. The six edge line groups form a virtual dodecagon. Because the number of rotations is larger, the contour of the virtual dodecagon is relatively close to the shape of the workpiece 110, so that the workpiece axial position C' relatively close to an actual workpiece axis of the workpiece 110 can be obtained. As can be seen from the above, if the rotational number is larger, the virtual polygon is closer to the contour of the workpiece 110, and the centroid of the virtual polygon is closer to the actual workpiece axis.

Figure 8:
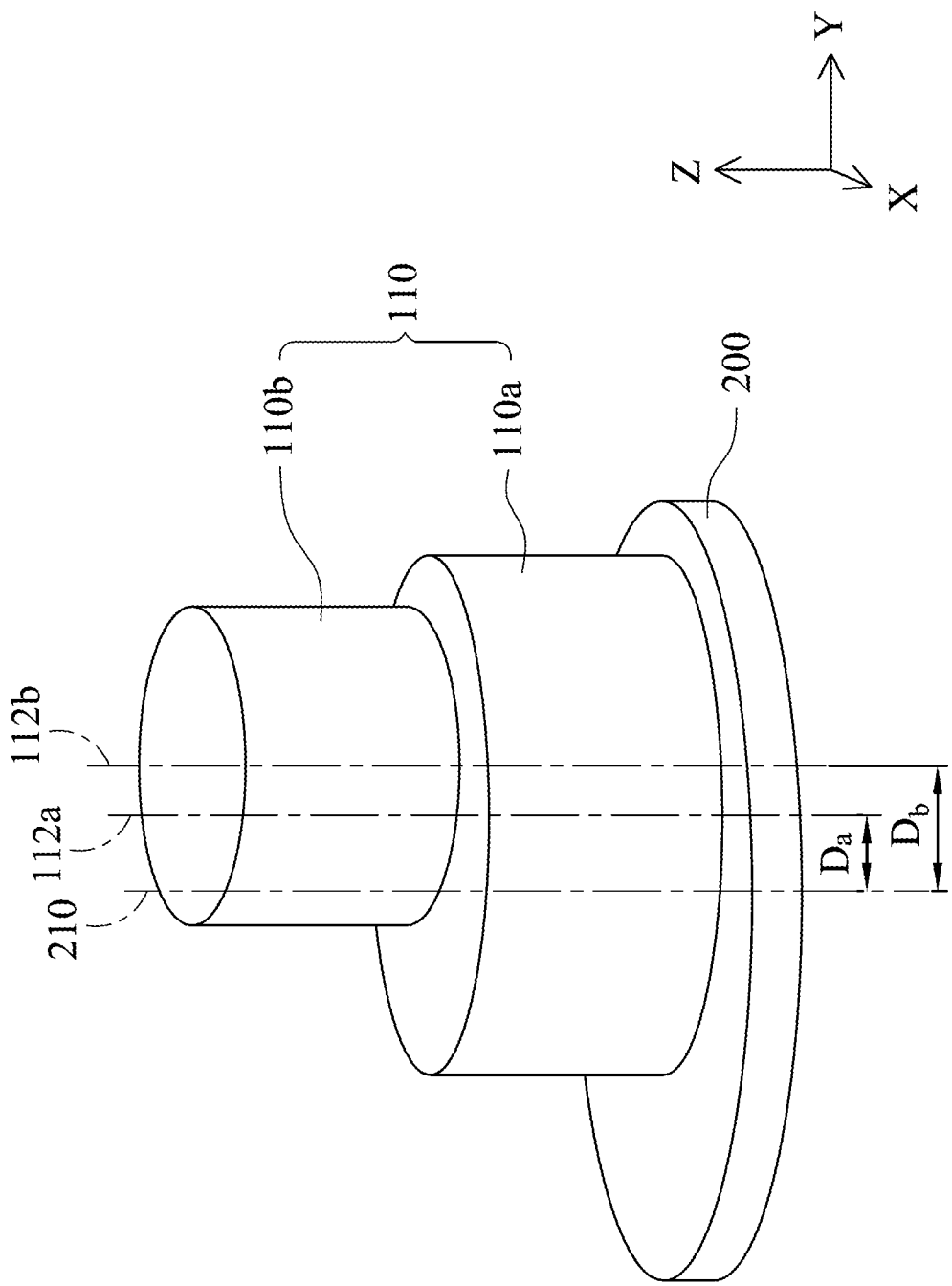
FIG. 8 shows a schematic view of the workpiece axial position according to a ninth example of the present disclosure.

Referring to FIGS. 1, 2 and 8, FIG. 8 shows a schematic view of the workpiece axial position C' according to a ninth example of the present disclosure. The workpiece 110 of the ninth example includes a first workpiece portion 110a and a second workpiece portion 110b. The first workpiece portion 110a is connected between the second workpiece portion 110b and the rotating plate 200. The first workpiece portion 110a and the second workpiece portion 110b are both cylindrical. A step difference is formed between the first workpiece portion 110a and the second workpiece portion 110b. The first workpiece portion 110a includes a first virtual workpiece axis 112a. The first virtual workpiece axis 112a and the virtual rotating axis 210 are separated by a first distance $D_a$. The second workpiece portion 110b includes a second virtual workpiece axis 112b. The second virtual workpiece axis 112b and the virtual rotating axis 210 are separated by a second distance $D_b$. Because the first workpiece portion 110a and the second workpiece portion 110b have different distances $D_a$, $D_b$ relative to different height positions, the image-measuring apparatus 100 without axial alignment of the present disclosure can not only measure the shapes of the workpieces at different heights, but also measure the roundness of each of the first workpiece portion 110a and the second workpiece portion 110b at different heights, and the concentricity between the first workpiece portion 110a and the second workpiece portion 110b at different heights.

Figure 9:
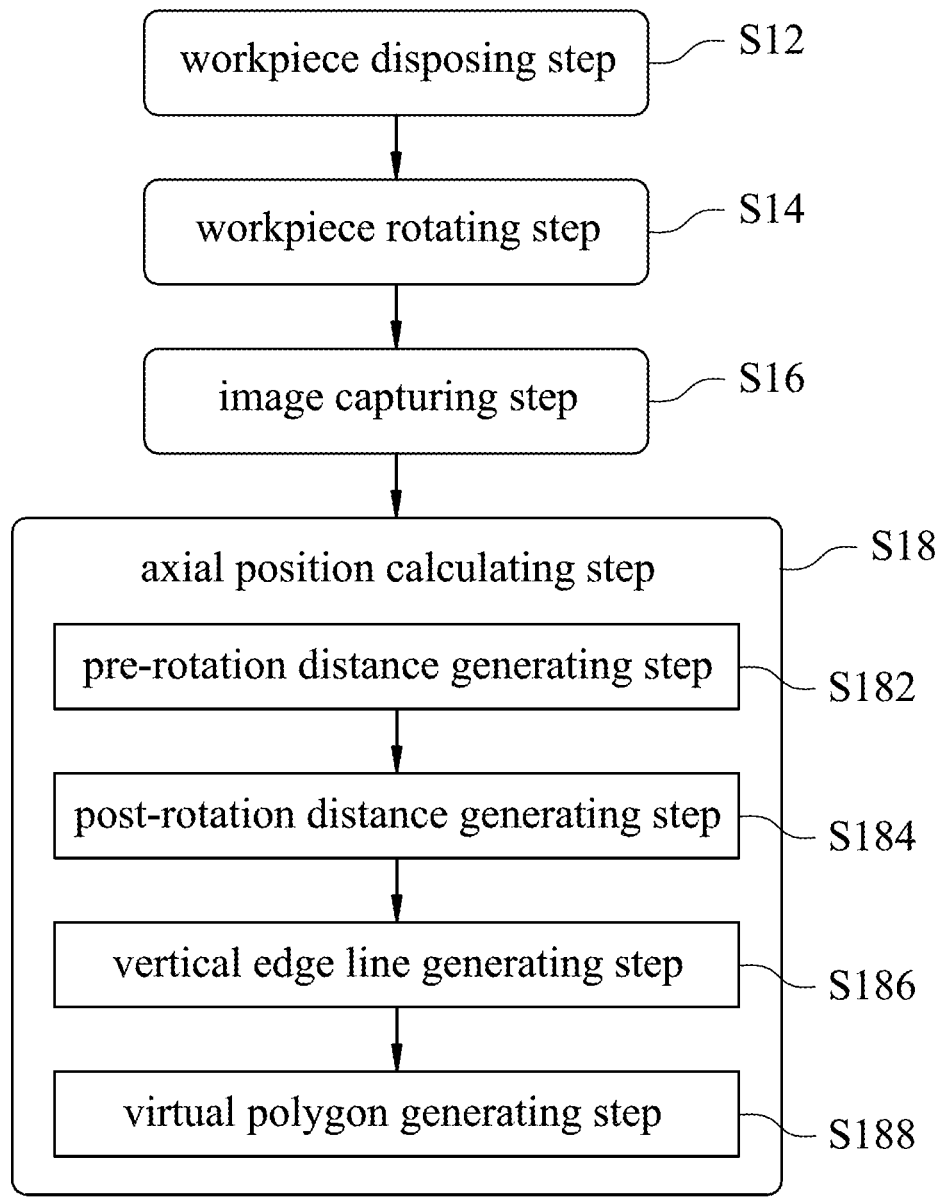
FIG. 9 shows a flow chart of an image-measuring method without axial alignment according to another embodiment of the present disclosure.

FIG. 9 shows a flow chart of an image-measuring method 700 without axial alignment according to another embodiment of the present disclosure. In FIGS. 1, 2 and 9, the image-measuring method 700 without axial alignment is configured to measure a workpiece 110 and includes a workpiece disposing step S12, a workpiece rotating step S14, an image capturing step S16 and an axial position calculating step S18. The workpiece disposing step S12, the workpiece rotating step S14, the image capturing step S16 and the axial position calculating step S18 are performed in sequence.

The workpiece disposing step S12 includes disposing the workpiece 110 on a rotating plate 200.

The workpiece rotating step S14 includes configuring a rotary driving member 600 to rotate the rotating plate 200 so as to synchronously rotate the workpiece 110.

The image capturing step S16 includes configuring a lighting unit 300 to generate a light beam 310 to illuminate the workpiece 110, and configuring an image capturing unit 400 to receive the light beam 310 and obtain a first workpiece blocking shadow area $S_0$.

The axial position calculating step S18 includes configuring a central control unit 500 to rotate the rotating plate 200 and the workpiece 110 through a rotational angle $\theta_n$ so as to obtain a second workpiece blocking shadow area $S_1$ via the image capturing unit 400. The central control unit 500 calculates the first workpiece blocking shadow area $S_0$ and the second workpiece blocking shadow area $S_1$ to generate a pre-rotation distance parameter and a post-rotation distance parameter, and the central control unit 500 calculates the pre-rotation distance parameter and the post-rotation distance parameter to generate a workpiece axial position C' which is an axial position of the workpiece 110. There is a distance $D_n$ between the rotating axial position C and the workpiece axial position C', and the distance $D_n$ is configured to judge whether the rotating axial position C is aligned with the workpiece axial position C'. In detail, the axial position calculating step S18 includes a pre-rotation distance generating step S182, a post-rotation distance generating step S184, a vertical edge line generating step S186 and a virtual polygon generating step S188. In the axial position calculating step S18, the pre-rotation distance generating step S182, the post-rotation distance generating step S184, the vertical edge line generating step S186 and the virtual polygon generating step S188 are performed in sequence. The pre-rotation distance generating step S182 includes configuring the central control unit 500 to determine a first pre-rotation virtual measuring line $L_{01}$ and a second pre-rotation virtual measuring line $L_{02}$, and then the first pre-rotation virtual measuring line $L_{01}$ and the second pre-rotation virtual measuring line $L_{02}$ are calculated by the central control unit 500 to generate a first pre-rotation distance $D_{01}$ and a second pre-rotation distance $D_{02}$, respectively. The first pre-rotation distance $D_{01}$ and the second pre-rotation distance $D_{02}$ are combined into the pre-rotation distance parameter. In addition, the post-rotation distance generating step S184 includes configuring the central control unit 500 to determine a first post-rotation virtual measuring line $L_{11}$ and a second post-rotation virtual measuring line $L_{12}$, and then the first post-rotation virtual measuring line $L_{11}$ and the second post-rotation virtual measuring line $L_{12}$ are calculated by the central control unit 500 to generate a first post-rotation distance $D_{11}$ and a second post-rotation distance $D_{12}$, respectively. The first post-rotation distance $D_{11}$ and the second post-rotation distance $D_{12}$ are combined into the post-rotation distance parameter. Moreover, the vertical edge line generating step S186 includes configuring the central control unit 500 to calculate the first pre-rotation virtual measuring line $L_{01}$, the second pre-rotation virtual measuring line $L_{02}$, the first post-rotation virtual measuring line $L_{11}$ and the second post-rotation virtual measuring line $L_{12}$ to generate two edge line groups. Each of the two edge line groups includes two virtual vertical edge lines $VL_n$ parallel to each other (i.e., the pre-rotation virtual vertical edge lines $VL_0$ and the post-rotation virtual vertical edge lines $VL_1$). One of the two edge line groups (i.e., the pre-rotation virtual vertical edge lines $VL_0$) is tangent to a plurality of contour edge lines of the first workpiece blocking shadow area $S_0$, and another of the two edge line groups (i.e., the post-rotation virtual vertical edge lines $VL_1$) is tangent to a plurality of contour edge lines of the second workpiece blocking shadow area $S_1$. Furthermore, the virtual polygon generating step S188 includes configuring the central control unit 500 to calculate a rotational number of the rotating plate 200, and the rotational number, the first workpiece blocking shadow area $S_0$ and the second workpiece blocking shadow area $S_1$ are calculated by the central control unit 500 to generate a plurality of edge line groups. Each of the edge line groups includes two virtual vertical edge lines $VL_n$ parallel to each other. The edge line groups are connected to each other so as to form a virtual polygon. The virtual polygon, the pre-rotation distance parameter and the post-rotation distance parameter are calculated by the central control unit 500 to generate the workpiece axial position C' which is the axial position of the workpiece 110. Accordingly, the present disclosure utilizes a non-contact image measuring technique to accurately estimate the workpiece axial position C' of the workpiece 110. The workpiece 110 can be arbitrarily placed or clamped without axial alignment, thereby generating a characteristic size of the workpiece 110.

Figure 10:
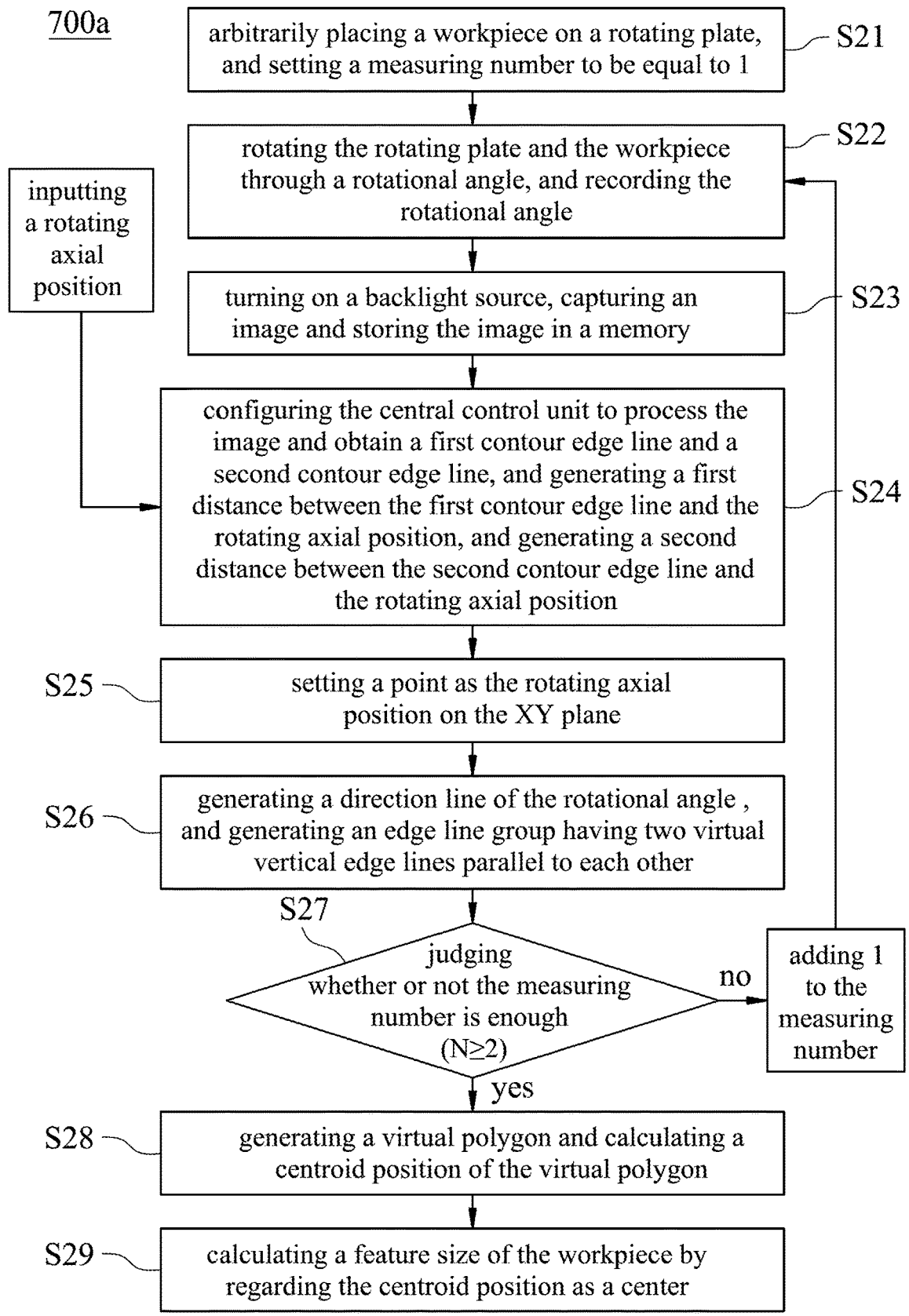
FIG. 10 shows a flow chart of an image-measuring method without axial alignment according to further another embodiment of the present disclosure.

FIG. 10 shows a flow chart of an image-measuring method 700a without axial alignment according to further another embodiment of the present disclosure. In FIGS. 1, 2 and 10, the image-measuring method 700a without axial alignment includes a plurality of steps S21, S22, S23, S24, S25, S26, S27, S28, S29. The step S21 includes arbitrarily placing a workpiece 110 on a rotating plate 200, and setting a measuring number N before rotation to be equal to 1. The step S22 includes rotating the rotating plate 200 and the workpiece 110 through a rotational angle $\theta_n$, and recording the rotational angle $\theta_n$. The measuring number N after n time rotation is equal to n plus 1, so that the measuring number N equal to 1 represents the number of measurements before rotation. The step S23 includes turning on a backlight source, i.e., configuring the lighting unit 300 and the image capturing unit 400 to capture an image, and storing the image in a memory 550 of a central control unit 500. The step S24 includes configuring the central control unit 500 to process the image and obtain a first contour edge line $SL_{n1}$ and a second contour edge line $SL_{n2}$, and generating a first distance $D_{n1}$ between the first contour edge line $SL_{n1}$ and the rotating axial position C, and generating a second distance $D_{n2}$ between the second contour edge line $SL_{n2}$ and the rotating axial position C. The step S25 includes setting a point as the rotating axial position C on the XY plane. The step S26 includes generating a direction line of the rotational angle $\theta_n$, and generating an edge line group having two virtual vertical edge lines $VL_n$ parallel to each other. The two virtual vertical edge lines $VL_n$ are separated from the rotating axial position C by a first distance $D_{n1}$ and a second distance $D_{n2}$, respectively. The step S27 includes judging whether or not the measuring number N is enough. If the measuring number N is not enough, the measuring number N adds 1, and the step S22 is performed repeatedly to rotate the rotating plate 200 through another rotational angle $\theta_n$. On the contrary, if the measuring number N is enough, the step S28 is performed. The step S28 includes configuring the central control unit 500 to generate a virtual polygon and calculate a centroid position of the virtual polygon. The step S29 includes calculating a characteristic size of the workpiece 110 by regarding the centroid position as a center. Therefore, the image-measuring methods 700, 700a without axial alignment of the present disclosure utilize a non-contact image measuring technique to accurately estimate the workpiece axial position C' of the workpiece 110 under the condition of arbitrarily placing the workpiece 110, thus accomplishing quick measurement, high convenience of measurement and low cost.

According to the aforementioned embodiments and examples, the advantages of the present disclosure are described as follows: 1. The image-measuring apparatus without axial alignment and the image-measuring measuring method without axial alignment of the present disclosure utilize the non-contact image measuring technique to accurately estimate the workpiece axial position of the workpiece. The workpiece can be arbitrarily placed or clamped on the rotating plate without axial alignment, thereby generating the characteristic size of the workpiece and greatly increasing convenience of measurement. 2. Because the rotating axial position does not need to be accurately aligned with the workpiece axial position, the present disclosure can greatly save measuring time to increase the efficiency of measurement. 3. The image-measuring apparatus without axial alignment and the image-measuring measuring method without axial alignment of the present disclosure utilize the image measuring technique without axial alignment so as to reduce the manpower and cost, and the accuracy is relatively high.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image-measuring method without axial alignment, which is configured to measure a workpiece, the image-measuring method without axial alignment comprising:
   providing a workpiece disposing step, wherein the workpiece disposing step comprises disposing the workpiece on a rotating plate, and the rotating plate comprises a rotating axial position;
   providing a workpiece rotating step, wherein the workpiece rotating step comprises configuring a rotary driving member to rotate the rotating plate so as to synchronously rotate the workpiece;
   providing an image capturing step, wherein the image capturing step comprises configuring a lighting unit to generate a light beam to illuminate the workpiece, and configuring an image capturing unit to receive the light beam and obtain a first workpiece blocking shadow area; and
   providing an axial position calculating step, wherein the axial position calculating step comprises configuring a central control unit to rotate the rotating plate and the workpiece through a rotational angle so as to obtain a second workpiece blocking shadow area via the image capturing unit, the central control unit calculates the first workpiece blocking shadow area and the second workpiece blocking shadow area to generate a pre-rotation distance parameter and a post-rotation distance parameter, and the central control unit calculates the pre-rotation distance parameter and the post-rotation distance parameter to generate a workpiece axial position which is an axial position of the workpiece;
   wherein there is a distance between the rotating axial position and the workpiece axial position, and the distance is configured to judge whether the rotating axial position is aligned with the workpiece axial position;
   wherein the axial position calculating step further comprises:
   providing a pre-rotation distance generating step, wherein the pre-rotation distance generating step comprises configuring the central control unit to determine a first pre-rotation virtual measuring line and a second pre-rotation virtual measuring line, and then the first pre-rotation virtual measuring line and the second pre-rotation virtual measuring line are calculated by the central control unit to generate a first pre-rotation distance and a second pre-rotation distance, respectively, and the first pre-rotation distance and the second pre-rotation distance are combined into the pre-rotation distance parameter; and providing a post-rotation distance generating step, wherein the post-rotation distance generating step comprises configuring the central control unit to determine a first post-rotation virtual measuring line and a second post-rotation virtual measuring line, and then the first post-rotation virtual measuring line and the second post-rotation virtual measuring line are calculated by the central control unit to generate a first post-rotation distance and a second post-rotation distance, respectively, and the first post-rotation distance and the second post-rotation distance are combined into the post-rotation distance parameter;

wherein the post-rotation distance generating step is performed after the pre-rotation distance generating step.

2. The image-measuring method without axial alignment of claim 1, wherein the axial position calculating step further comprises:

providing a vertical edge line generating step, wherein the vertical edge line generating step comprises configuring the central control unit to calculate the first pre-rotation virtual measuring line, the second pre-rotation virtual measuring line, the first post-rotation virtual measuring line and the second post-rotation virtual measuring line to generate two edge line groups, each of the two edge line groups comprises two virtual vertical edge lines parallel to each other, one of the two edge line groups is tangent to a plurality of contour edge lines of the first workpiece blocking shadow area, and another of the two edge line groups is tangent to a plurality of contour edge lines of the second workpiece blocking shadow area.

3. An image-measuring method without axial alignment, which is configured to measure a workpiece, the image-measuring method without axial alignment comprising:

providing a workpiece disposing step, wherein the workpiece disposing step comprises disposing the workpiece on a rotating plate, and the rotating plate comprises a rotating axial position;

providing a workpiece rotating step, wherein the workpiece rotating step comprises configuring a rotary driving member to rotate the rotating plate so as to synchronously rotate the workpiece;

providing an image capturing step, wherein the image capturing step comprises configuring a lighting unit to generate a light beam to illuminate the workpiece, and configuring an image capturing unit to receive the light beam and obtain a first workpiece blocking shadow area; and providing an axial position calculating step, wherein the axial position calculating step comprises configuring a central control unit to rotate the rotating plate and the workpiece through a rotational angle so as to obtain a second workpiece blocking shadow area via the image capturing unit, the central control unit calculates the first workpiece blocking shadow area and the second workpiece blocking shadow area to generate a pre-rotation distance parameter and a post-rotation distance parameter, and the central control unit calculates the pre-rotation distance parameter and the post-rotation distance parameter to generate a workpiece axial position which is an axial position of the workpiece;

wherein there is a distance between the rotating axial position and the workpiece axial position, and the distance is configured to judge whether the rotating axial position is aligned with the workpiece axial position;

wherein the axial position calculating step further comprises:

providing a virtual polygon generating step, wherein the virtual polygon generating step comprises configuring the central control unit to calculate a rotational number of the rotating plate, and the rotational number, the first workpiece blocking shadow area and the second workpiece blocking shadow area are calculated by the central control unit to generate a plurality of edge line groups, each of the edge line groups comprises two virtual vertical edge lines parallel to each other, the edge line groups are connected to each other so as to form a virtual polygon, and the virtual polygon, the pre-rotation distance parameter and the post-rotation distance parameter are calculated by the central control unit to generate the workpiece axial position which is the axial position of the workpiece.

* * * * *